United States Patent [19]

Bögel

[11] 4,349,106
[45] Sep. 14, 1982

[54] PLASTIC RIBBON FOR SUPPLY OF BOLT-LIKE FASTENER ELEMENTS

[75] Inventor: Gerhard Bögel, Heerbrugg, Switzerland

[73] Assignee: SFS Stadler AG, Heerbrugg, Switzerland

[21] Appl. No.: 123,782

[22] Filed: Feb. 22, 1980

[30] Foreign Application Priority Data

Feb. 26, 1979 [DE] Fed. Rep. of Germany ....... 2907486

[51] Int. Cl.³ .............................................. B65D 85/24
[52] U.S. Cl. ...................................... 206/347; 206/485
[58] Field of Search ........................ 206/346, 347, 485; 220/339

[56] References Cited

U.S. PATENT DOCUMENTS

| | | |
|---|---|---|
| 3,450,255 | 6/1969 | Mosetich .............................. 206/347 |
| 3,841,472 | 10/1974 | Fuller et al. .......................... 206/347 |
| 3,885,669 | 5/1975 | Potucek ................................. 206/347 |
| 3,910,324 | 10/1975 | Nasiatka ............................... 206/347 |
| 3,930,297 | 1/1976 | Potucek et al. ...................... 206/347 |
| 4,084,720 | 4/1978 | Thurston ............................. 206/566 |
| 4,184,594 | 1/1980 | Hehn ................................... 206/339 |

Primary Examiner—Joseph Man-Fu Moy
Attorney, Agent, or Firm—Toren, McGeady & Stanger

[57] ABSTRACT

An elongate supply ribbon of plastic material for supporting bolt-like fastener elements is structured with a back wall portion and a plurality of tongues extending from opposite sides of the back wall portion generally perpendicularly to the plane thereof. Bending regions interposed between the back wall portion and the tongues are formed with notches which have sides abutting each other when the tongues are bent to extend perpendicularly from the plane of the back wall portion in order to provide bearing support for the tongues.

6 Claims, 11 Drawing Figures

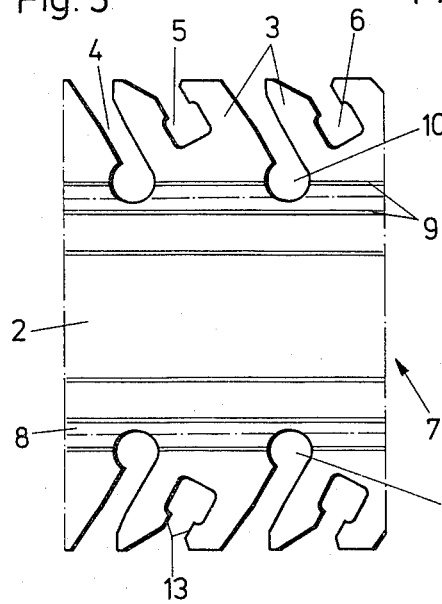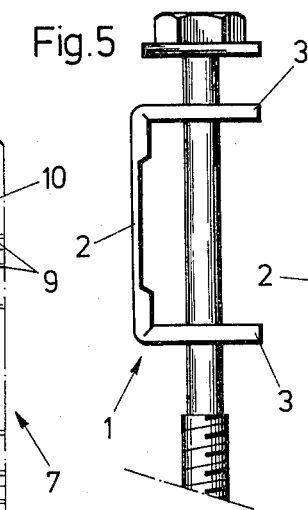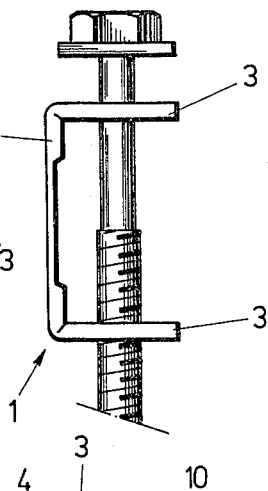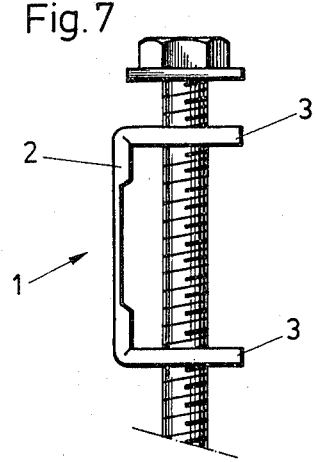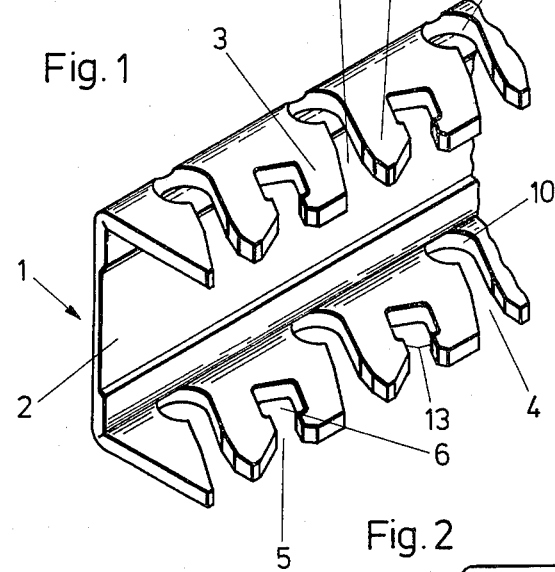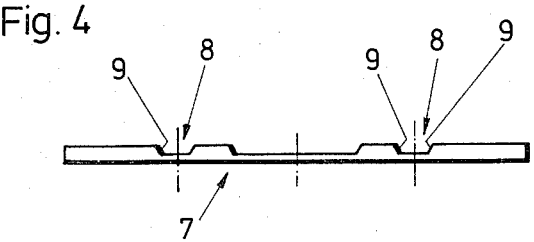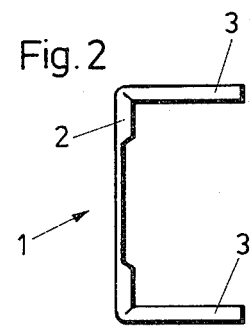

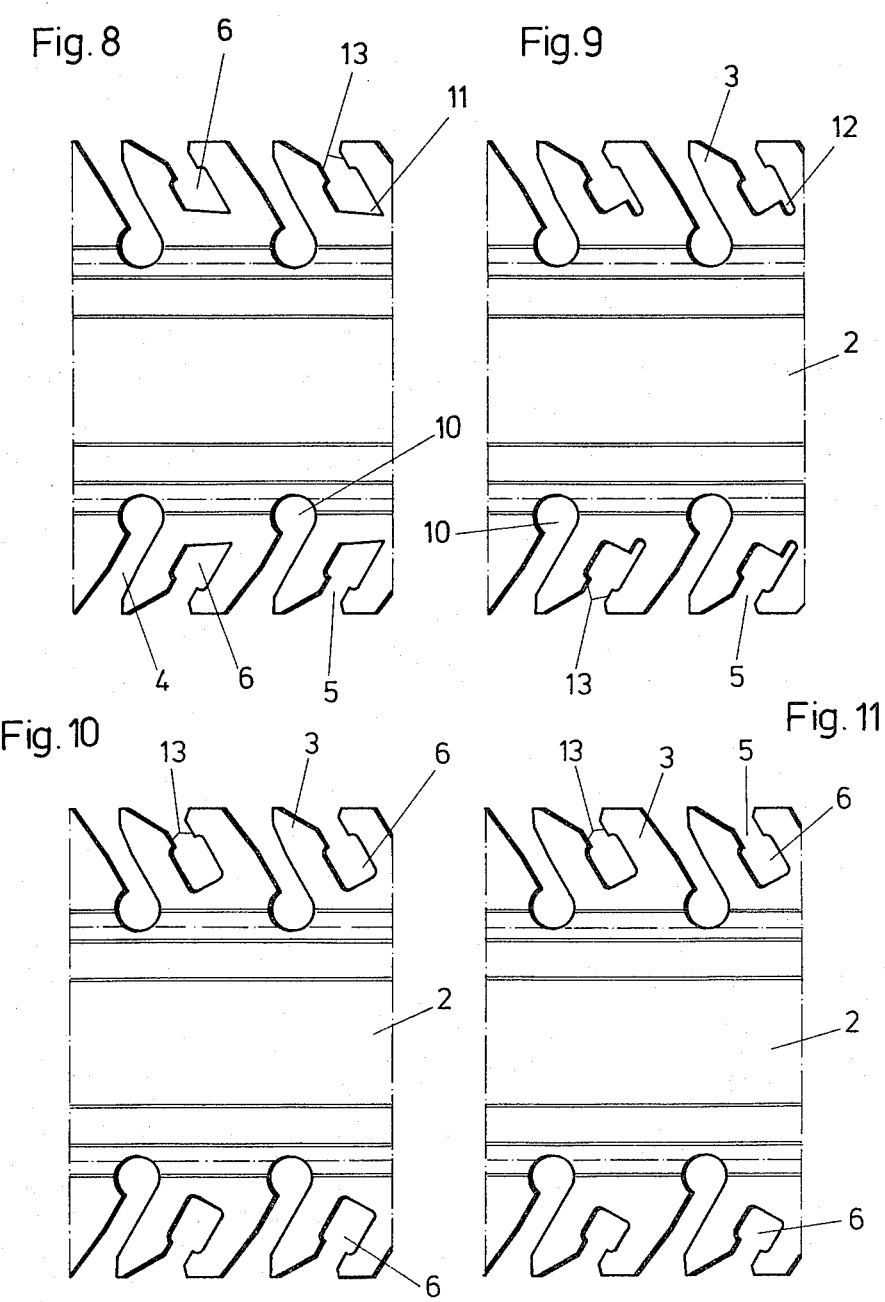

PLASTIC RIBBON FOR SUPPLY OF BOLT-LIKE FASTENER ELEMENTS

The present invention relates generally to a supply ribbon or magazine strip, made of plastic material, and particularly adaptable for use in the supply of bolt-like fastening elements. The type of device to which the present invention relates is generally structured with a back wall portion and with tongues which project from the back wall portion and which operate to support therebetween the fastener elements which are to be supplied.

In the prior art, a supply strip or ribbon for supporting bolt-like fastening elements is known wherein the fastening elements are held by a spreading of fork-like ends of the tongues of the supply ribbon. In this device, at least one of the tongues of the supply strip must engage the threaded portion of the screw or fastening element which is to be supported. A bending notch is provided in the bending areas between the back wall portion and the tongues and in this case the bending action is not limited and the tongues are fed in or inserted in an approximately perpendicular position of the tongues relative to the back wall portion. Thus, the tongues are held in this position during transport of the screws. In the case of relatively heavy, long screws or fastening elements, this results in a significant disadvantage since both tongues will be deflected in one direction so that subsequent feeding into a user device such as for example an automatic screw driving machine, also becomes rather difficult.

It is further known to utilize such a holding or support strip for nails or similar fastening means. In such case, the tongues projecting from the back wall portion receive the fastening means. The fastening means are held in two oppositely located tongues in such a manner that during infeed of the fastening means to a user element, the upper tongue is first released and then the lower tongue is released with these tongues being each folded downwardly without affecting the position of the adjacent tongue. By means of a holding strip of this type it is also not possible to transport heavy fastening means and to feed them into a device for an attachment operation.

Accordingly, the present invention is directed to the task of providing a device which will avoid the aforementioned disadvantages and which will be relatively stable particularly in the areas of the bending region and which will therefore provide the capacity for enabling fastening elements of a wider variety of size and weight to be received.

SUMMARY OF THE INVENTION

Briefly, the present invention may be described as an elongate supply ribbon of plastic material for supporting bolt-like fastener elements comprising: a back wall portion extending longitudinally of said ribbon; a plurality of tongues extending from opposite sides of the back wall portion transversely to the longitudinal direction thereof; receiving slots formed in each of the tongues and adapted to receive in supporting engagement therein the fastening elements, said receiving slots being provided with an inlet opening and an adjoining widened opening for engaging a fastener element; bending regions interposed between the back wall portion and the tongues operative to permit the tongues to be bent relative to the back wall portion into a position so that the tongues will lie within planes extending generally perpendicularly to the plane of the back wall portion, said bending regions having a thickness dimension which is greater than the thickness dimension of at least a part of the back wall portion; and notches formed in the bending regions to define generally opposed bearing surfaces which are brought into abutting engagement with each other when the tongues are in said bent position relative to the back wall portion.

As a result of the invention, the disadvantages arising with prior art devices are overcome in that the supply ribbon is structured to be thickened at least through the bending regions, and in that the side surfaces of the notches, which are preferably shaped as planar surfaces, will be arranged to rest against each other with the tongues in the bent state extending at an angle of approximately 90° relative to the back wall portion.

As a result of the measures provided in accordance with the present invention, the bending regions of the supply ribbon are structured with added thickness and strength so that the freely projecting tongues will be deflected relative to the back wall portion only to an insignificant degree, if at all. Since the tongues are blocked at the opposed bearing surfaces of the notches against further deflection, an especially stable supply ribbon is obtained whereby it is possible to support and transport fastener elements such as screws or nails even if they are of a relatively heavy weight. Whether transportation of the fastener elements occurs with the back wall portion in a vertical or horizontal position, the tongues will always remain in a position approximately perpendicular to the back wall portion so that even subsequent feeding of the fastener elements into a device operative to establish attachment thereof will be enabled without significant difficulties.

A supply ribbon of the type provided by the present invention is especially useful in cases where the fastener elements are pulled out of a supply strip in a plane extending perpendicularly to the back wall portion. The use of such a supply ribbon in a device for installation of the fastener elements is also very advantageous because a position of stability of the fastener elements is insured up to the point where they are removed from the strip.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a perspective view of a supply ribbon structured in accordance with the present invention;

FIG. 2 is a side view of the supply ribbon;

FIG. 3 is a top view of the supply ribbon of the invention shown in its flattened state with the tongue members lying in the same plane as the back wall portion;

FIG. 4 is a side view of the supply ribbon shown in its flattened, unbent state;

FIG. 5 is a side view showing a supply ribbon with an inserted bolt or screw wherein both of the tongues engage the shank of the screw;

FIG. 6 is a side view similar to that of FIG. 5 wherein, however, one of the tongues engages the threaded portion of the screw and one tongue engages the shank portion of the screw;

FIG. 7 is a side view again showing an embodiment similar to that of FIG. 5 wherein both tongues engage the threaded portion of a supported screw; and FIGS. 8–11 are plan views showing various additional embodiments of a supply ribbon in accordance with the present invention shown in the unbent state.

DETAILED DESCRIPTION OF PREFERRED EMBODIMENTS

Referring now to the drawings, wherein similar reference numerals refer to like parts throughout the various figures thereof, a supply strip 1 structured in accordance with the present invention is shown to consist of a suitable plastic material, with the strip 1 being manufactured in the form of a ribbon 7. In its final form, the supply strip 1 will consist of a back wall portion 2 and tongues 3 which project approximately perpendicularly from the edges of the back wall portion 2. The tongues 3 are arranged adjacent each other with narrow spacing therebetween.

Slots 4 are provided between individual tongues 3. The slots 4 are widened at their ends facing toward the bending region of the strip or ribbon. The tongues are each formed with an inlet opening 5 and with an adjoining widened area 6 whereby the widened area 6 will engage the shank or the threaded portion of a bolt-like fastener element.

The essential feature of the supply strip resides in the fact that the ribbon 7 forming the strip is thickened at least in the region of bending notches 8 which extend between the back wall portion 2 and the tongues 3. Each of the bending regions or notches 8 is formed in a notched configuration which defines on opposite sides thereof side surfaces 9. The side surfaces 9 are preferably formed with a planar configuration and arranged so that they will bear against each other in the bent state of the tongues 3. Thus, the surfaces 9 will form bearing surfaces when the tongues 3 are bent to extend within planes which are generally perpendicular to the plane of the back wall portion 2, as indicated in the drawings, particularly in FIGS. 1 and 2.

As a result of the structural configuration of the bending regions or notches 8 and the opposed planar side surfaces 9, a bending stop is created which, together with the thickened bending region within which the notches are formed, will insure a special stability of the freely projecting tongues 3.

In the embodiment illustrated, the larger thickness of the thickened zone or region 8 is extended so that the tongues 3 will also be formed with a similar thickness dimension and so that the edge regions of the back wall portion 2 will also have the thicker dimension extending over a portion thereof. This will produce additional strengthening of all of the tongues which are to support the fastener elements which are engaged therein in positive engagement.

Of course, the bearing surfaces 9 need not be formed so that they will bear against each other over their entire surface area. It is generally sufficient if a forward edge region of the bearing surfaces 9 bears against the opposed bearing surface 9. Depending upon the thickness in the region of the bending area, the shape of the bending notch 8 may also be formed differently. For example, it would be within the scope of the present invention to construct the bending notch 8 with a V-shaped cross-sectional configuration. However, it is considered advantageous if the bottom portion of the bending notch 8 extends rectilinearly through a small length since this will facilitate the bending action. Accordingly, it is considered advantageous if the bending notch 8 is constructed with a trapezoidal cross-sectional configuration.

Since the center part of the back wall portion 2 is structured to be significantly thinner than the edge parts of the back wall portion which extends into the bending region of the supply ribbon, it is possible to roll the supply strip or ribbon. Of course, for additional reinforcement in the transverse direction of the back wall portion 2, reinforcing ribs may be provided with a particular spacing.

In the drawings, the slots 4 are shown as formed with a widened area 10 at the rearward end of the slots, with the widened area 10 reaching into the region of the bending notches 8 and being constructed with an essentially circular configuration. This circular punched widened area essentially operates to prevent tearing or damage of the ribbon.

A further significant structural aspect of the supply ribbon of the present invention resides in the fact that the slots 4 located between the tongues 3, as well as the inlet openings 5 and the widened areas 6, all extend in the same direction at an acute angle from the bending notch 8. This results in a simple removal of the fastener elements in a device for effecting attachment thereof.

Within the scope of the invention, it is particularly advantageous to form the bearing surfaces to provide a bending stop with the tongues approximately perpendicular to the back wall portion, this aspect being emphasized as particularly advantageous when the supply ribbon is to be filled with the fastener elements. When constructed precisely, it is possible to omit an internal guide for the supply strip since the tongues can usually resist further deflection toward each other.

The fastener elements may be simply inserted into the inlet openings 5 and then into the widened areas 6 of the supply strip 1. A secure support for the fastener elements is insured by forming the width or the length of the widened areas to be equal to or smaller than the shank diameter or the core diameter of a thread of a fastener element to be supported. Because of the thickened design of the tongues, it is also not necessary for the freely projecting lugs of the tongues 3 to be deflected for the purpose of providing the required support since, in this case, the threads will dig into the portions of the tongues which remain straight.

As a result of these measures, the supply strip of the invention is capable of holding in a clamping manner even smooth shanks, this support being effected by the tongues which project without initial tension in a perpendicular direction. Of course, the shape of the widened area 6 for receiving the screws should only be considered as an exemplary configuration and, depending upon the type of fastener means to be inserted, other appropriate shapes may be advantageously utilized. Examples of design variations are shown in FIGS. 8 through 11. For example, in FIG. 8 there is shown a possibility of providing an end 11 with an acute angle at the rearward corner of the widened area 6. According to the proposal of FIG. 9, it is also possible to provide finger-like incisions 12 at the rearward end of the widened area 6. The embodiments according to FIGS. 8 and 9 have the objective of additionally facilitating spreading of the tongues when the fastening elements are inserted.

In the embodiment according to FIG. 10, the widened areas are rectangular whereby the long sides extend in the direction of insertion of a fastener element. Such a design has been particularly advantageous in supply strips in which both tongues engage the threaded portion of the fastener element. In accordance with FIG. 11, elongated, rectangular widened areas 6 are provided in the tongues 3 on one side thereof and square widened areas 6 are provided in the other tongues 3. This embodiment is advantageous when the threaded portion of the fastener element is to be engaged on one side and when a non-threaded shank region is to be engaged on the other side.

In all of the design variations, a significant and particularly advantageous feature resides in the fact that the inlet openings 5 for the fastener elements are defined at least over a portion of their longitudinal extension by sides 13 which extend to be approximately parallel relative to each other. This results in a strong projection in the region of the inlet opening 5 so that an appropriate retaining force is obtained for preventing the fastener elements from becoming dislodged. This strong projection cannot be squeezed and, therefore, cannot be damaged even when the fasteners are inserted.

While specific embodiments of the invention have been shown and described in detail to illustrate the application of the inventive principles, it will be understood that the invention may be embodied otherwise without departing from such principles.

What is claimed is:

1. An elongate supply ribbon of plastic material for supporting bolt-like fastener elements comprising: a back wall portion extending longitudinally of said ribbon; a plurality of tongues extending from opposite sides of said back wall portion transversely to the longitudinal direction thereof; receiving slots formed in each of said tongues adapted to receive in supporting engagement therein said fastener elements, said receiving slots being provided with an inlet opening and an adjoining widened opening for engaging a fastener element; bending regions extending the entire length of said ribbon on both sides of said back wall portion interposed between said back wall portion and said tongues operative to permit said tongues to be bent relative to said back wall portion into a position to lie within planes extending generally perpendicularly to the plane of said back wall portion, said bending regions being formed from contiguous integral parts of said back wall portion and of said tongues and having a thickness dimension which is greater than the thickness dimension of at least other parts of said back wall portion; and a pair of essentially contiguous notches formed, respectively, in each of said bending regions, each of said notches extending longitudinally of said back wall portion essentially along the entire length thereof and being defined by generally opposed bearing surfaces which are brought into abutting engagement with each other when said tongues are in said bent position relative to said back wall portion; said bearing surfaces of each of said notches being structured to be in abutting engagement with each other when said tongues extend at 90° to said back wall portion in order to support said tongues at said 90° angle when said fastener elements are engaged within said receiving slots and to prevent further bending of said tongues beyond said 90° angle.

2. A supply ribbon according to claim 1 wherein said greater thickness dimension is formed to extend through the entire length of said tongues and through an edge region of said back wall portion.

3. A supply ribbon according to claim 1 wherein said notches are formed with a trapezoidal cross-sectional configuration.

4. A supply ribbon according to claims 1, 2 or 3 wherein separating slots are formed between individual ones of said plurality of tongues, said separating slots being widened in the area of said notches.

5. A supply ribbon according to claim 4 wherein said separating slots between said tongues, said inlet openings for said fastener elements and said adjoining widened openings of said receiving slots extend in the same direction at an acute angle relative to the longitudinal direction of said notches.

6. A supply ribbon according to claim 5 wherein said inlet openings of said receiving slots for said fastener elements are defined over at least a portion of their length by receiving slot sides which extend at least approximately parallel to each other.

* * * * *